(12) United States Patent
Byun et al.

(10) Patent No.: US 12,149,879 B2
(45) Date of Patent: Nov. 19, 2024

(54) WIRELESS SOUND DEVICE AND METHOD FOR CONTROLLING THE SAME

(71) Applicant: LG ELECTRONICS INC., Seoul (KR)

(72) Inventors: Joonwon Byun, Seoul (KR); Sangkuk Jeon, Seoul (KR); Mansoo Sin, Seoul (KR); Hoyoun Lee, Seoul (KR); Hyojin Kim, Seoul (KR); Yehan Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 260 days.

(21) Appl. No.: 17/836,528

(22) Filed: Jun. 9, 2022

(65) Prior Publication Data

US 2023/0164474 A1 May 25, 2023

(30) Foreign Application Priority Data

Nov. 22, 2021 (WO) ................ PCT/KR2021/017134

(51) Int. Cl.
*H04R 1/10* (2006.01)
*G06F 3/041* (2006.01)

(52) U.S. Cl.
CPC ......... *H04R 1/1041* (2013.01); *G06F 3/0418* (2013.01); *H04R 1/1016* (2013.01);
(Continued)

(58) Field of Classification Search
CPC ......... G06F 3/0418; G06F 2203/04105; G06F 1/163; G06F 1/1688; G06F 1/169;
(Continued)

(56) References Cited

U.S. PATENT DOCUMENTS

| 11,153,687 | B1 * | 10/2021 | Graham ................ G06F 3/017 |
| 2021/0084403 | A1 | 3/2021 | Hviid |
| 2021/0168487 | A1 | 6/2021 | Harjee et al. |

FOREIGN PATENT DOCUMENTS

| KR | 10-2015-0109693 | 10/2015 |
| KR | 10-2018-0120302 | 11/2018 |

(Continued)

OTHER PUBLICATIONS

PCT International Application No. PCT/KR2021/017134, Written Opinion and International Search Report dated Aug. 19, 2022, 9 pages.

(Continued)

*Primary Examiner* — Brian Ensey
(74) *Attorney, Agent, or Firm* — LEE, HONG, DEGERMAN, KANG & WAIMEY

(57) ABSTRACT

A wireless sound device capable of effectively receiving a command that meets a user's intention without an error despite a user input unit having a limited size, and a method for controlling the same. The wireless sound device includes a wireless communication unit for wireless communication with an external device, a touch sensor for sensing a touch input of a user in a touch standby mode, a force sensor for sensing a force based on the touch input, a sound output unit for outputting an audio signal received from the external device, and a controller that controls a touch mode of the wireless sound device to be switched to a touch accepting mode or a touch ignoring mode in response to the touch input, and, when a touch validity of the touch input is positive, the controller controls the touch mode to be switched to a touch accepting mode or a touch ignoring mode based on a force validity of the touch input.

18 Claims, 18 Drawing Sheets

(4-1)

(4-2)

(4-3)

(52) U.S. Cl.
CPC . *H04R 1/1075* (2013.01); *G06F 2203/04105* (2013.01); *H04R 2420/07* (2013.01)

(58) Field of Classification Search
CPC ...... G06F 1/3215; G06F 1/324; G06F 1/3278; G06F 1/3296; G06F 3/04847; G06F 3/04883; H04R 1/1041; H04R 1/1016; H04R 1/1075; H04R 2420/07; H04R 2225/61
See application file for complete search history.

(56) References Cited

FOREIGN PATENT DOCUMENTS

| | | |
|---|---|---|
| KR | 10-2019-0079289 | 7/2019 |
| KR | 10-2021-0035246 | 3/2021 |

OTHER PUBLICATIONS

European Patent Office Application Serial No. 22179096.7, European Partial Search Report dated Nov. 29, 2022, 12 pages.

\* cited by examiner

FIG. 4
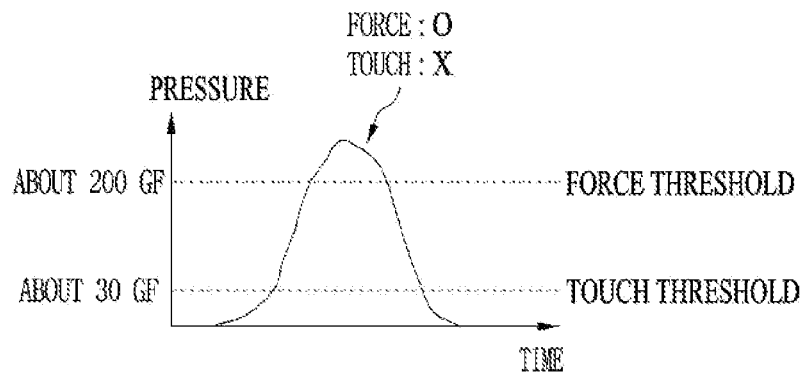
(4-1)
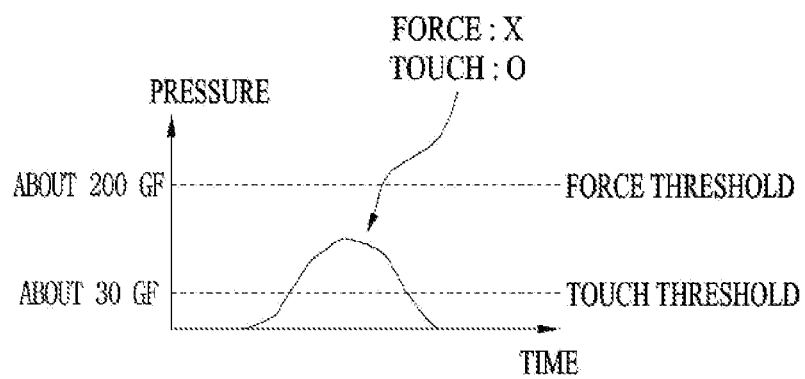
(4-2)
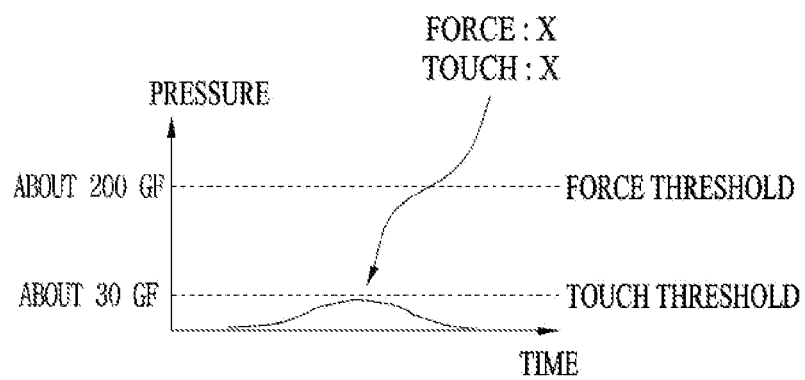
(4-3)

WIRELESS SOUND DEVICE AND METHOD FOR CONTROLLING THE SAME

CROSS-REFERENCE TO RELATED APPLICATIONS

Pursuant to 35 U.S.C. § 119, this application claims the benefit of an earlier filing date and right of priority to International Application No. PCT/KR2021/017134, filed on Nov. 22, 2021, the contents of which are hereby incorporated by reference herein in its entirety.

BACKGROUND

Field

The present disclosure relates to a wireless sound device capable of providing a user with a sound by receiving a sound signal from a terminal via wireless communication with a terminal, and a method for controlling the same.

Discussion of the Related Art

A sound device may refer to an electronic device in which a speaker for receiving a sound signal from a terminal and outputting the sound signal and a microphone for collecting an ambient sound (e.g., a user voice) and transmitting the ambient sound to the terminal are combined with each other. For example, there may be a headset, an earset, and the like.

Conventionally, a wired-type sound device that receives the sound signal by being wiredly connected an ear jack terminal of the terminal has been widely used, but a demand for a wireless-type sound devices is increasing in terms of mobility and ease of use in recent years.

Recently, a size of the sound device has become smaller, so that many wireless sound devices in a form of an earbud that may be inserted into an ear have been developed. The earbud-type wireless sound device that may be inserted into the user's ear has a wireless communication unit and a battery therein to perform wireless communication with an external terminal. In this case, as a size of the earbud-type wireless sound device becomes smaller in order to improve portability and wearability, a place for disposing a user input unit for receiving a user command also tends to become smaller.

SUMMARY

The present disclosure is to provide a wireless sound device capable of effectively receiving a command that meets a user's intention without an error despite a user input unit having a limited size, and a method for controlling the same.

According to one aspect of the present disclosure to achieve the above object, provided is a wireless sound device including a wireless communication unit for wireless communication with an external device, a touch sensor for sensing a touch input of a user in a touch standby mode, a force sensor for sensing a force based on the touch input, a sound output unit for outputting an audio signal received from the external device, and a controller that controls a touch mode of the wireless sound device to be switched to a touch accepting mode or a touch ignoring mode in response to the touch input, wherein, when a touch validity of the touch input is positive, the controller controls the touch mode to be switched to a touch accepting mode or a touch ignoring mode based on a force validity of the touch input.

The controller may control an operation corresponding to the touch input with respect to the touch sensor to be performed in the touch accepting mode, and control the touch input with respect to the touch sensor to be ignored until the touch input is released from the touch sensor in the touch ignoring mode.

The controller may control the touch mode to be switched to the touch ignoring mode when the touch validity is positive and the force validity is positive, and control the touch mode to be switched to the touch accepting mode when the touch validity is positive and the force validity is negative.

The controller may control the touch mode to be switched to the touch ignoring mode when the touch validity is negative.

The controller may control the touch mode to be switched to the touch standby mode when the touch is released.

The touch validity may be determined based on a pressure of the touch input.

The touch validity may be determined by further considering at least one of a touch area, a change in a touch position, and touch movement coordinates of the touch input.

The controller may determine whether to recognize the force as a force with respect to the force sensor based on whether the wireless sound device is in the touch accepting mode when the force validity of the touch input is positive.

The controller may not recognize the force as an input with respect to the force sensor when the wireless sound device is in the touch accepting mode, and may recognize the force as the input with respect to the force sensor when the wireless sound device is not in the touch accepting mode.

The force validity may be determined based on a pressure of the touch input.

The force validity may be determined by further considering whether the touch input is sensed by the touch sensor.

The controller may control the touch mode to be switched from a touch sleep mode to the touch standby mode when a pressure of the touch input during the touch sleep mode has a strength equal to or higher than a preset value.

The controller may adjust an operation level in consideration of a scroll distance per unit time of a touch scroll sensed in the touch accepting mode.

The controller may control the scroll distance per unit time of the touch scroll to be inversely proportional to the adjusted operation level.

The controller may control an operation command based on the adjusted operation level to be transmitted to the external device.

According to another aspect of the present disclosure to achieve the above object, provided is a method for controlling a wireless sound device including sensing, by a touch sensor, a touch input of a user in a touch standby mode and sensing, by a force sensor, a force based on the touch input, and switching a touch mode of the wireless sound device to a touch accepting mode or a touch ignoring mode in response to the touch input, wherein, when a touch validity of the touch input is positive, the touch mode is switched to the touch accepting mode or the touch ignoring mode based on a force validity of the touch input.

The effects of the wireless sound device and the method for controlling the same according to the present disclosure will be described as follows.

According to at least one of the embodiments of the present disclosure, a command that meets the user's intention is accepted, but a command that is determined to be inconsistent with the user's intention is ignored, so that, despite the user input unit of the limited size, the commands that meet the user's intentions may be selectively received without the error.

In addition, according to at least one of the embodiments of the present disclosure, as various types of user input are able to be received, despite the user input unit of the limited size, the user commands may be efficiently received.

A further scope of applicability of the present disclosure will become apparent from the detailed description below. However, because, various changes and modifications within the spirit and scope of the present disclosure may be clearly understood by those skilled in the art, it should be understood that the detailed description and specific embodiments, such as preferred embodiments of the present disclosure, are given by way of example only.

BRIEF DESCRIPTION OF THE DRAWINGS

FIG. 4 shows graphs illustrating pressures corresponding to a touch input and a force input according to an embodiment of the present disclosure.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The terminology used herein is selected as a general terminology that is widely used currently as possible while taking a function thereof in the present disclosure into account, but this may vary depending on an intention or a custom of a person skilled in the art, emergence of new technology, or the like. In addition, in specific cases, there are terms arbitrarily selected by the applicant, and in this case, meanings thereof will be described in the description of the corresponding invention. Therefore, it is intended to clarify that the terms used herein should be interpreted based on the actual meaning of the terms and the contents of the entire specification, rather than the simple names of terms.

Figure 1:
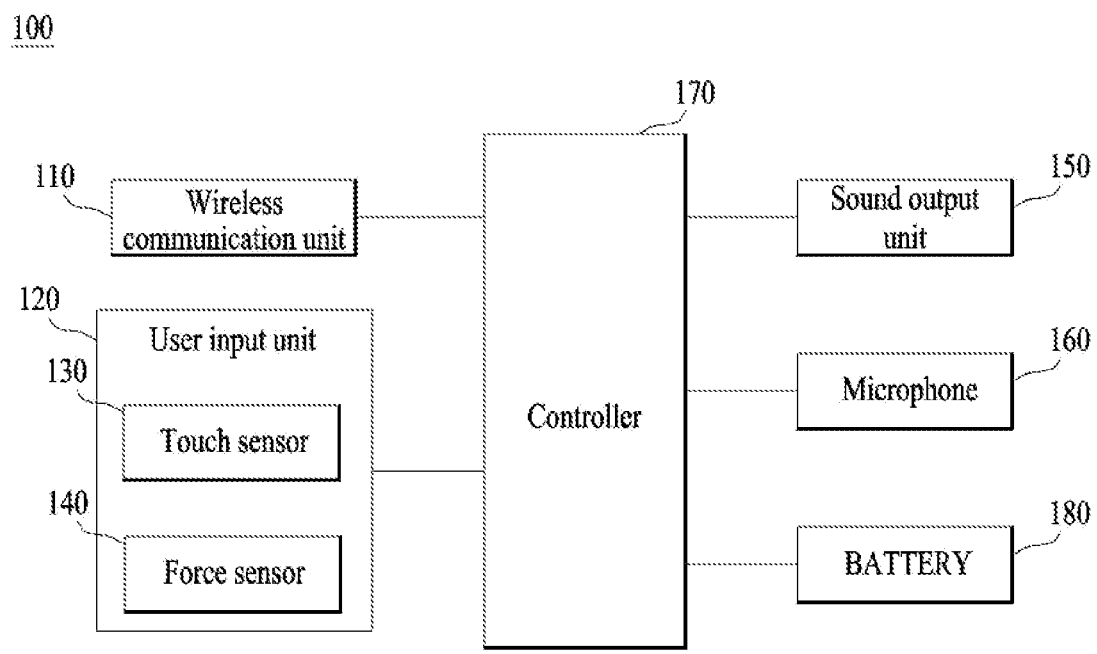
FIG. 1 is a schematic block diagram of a wireless sound device according to an embodiment of the present disclosure.

FIG. 1 is a schematic block diagram of a wireless sound device according to an embodiment of the present disclosure.

Referring to FIG. 1, a wireless sound device 100 according to an embodiment of the present disclosure may include a wireless communication unit 110, a user input unit 120, a microphone 130, a sound output unit 150, a controller 170, and a battery 180.

The components of the block diagram may be integrated, added, or omitted based on specifications of the wireless sound device that is actually implemented. That is, two or more components may be combined into one component, or one component may be subdivided into two or more components as needed. In addition, a function performed in each block is to describe the embodiment of the present disclosure, and a specific operation in each block or a device of each block does not limit the scope of the present disclosure.

The wireless communication unit 110 is a device connected with the external terminal or a device for performing wireless communication with a server, and may use different communication modes depending on a wireless communication target, distance, data amount and speed. The wireless communication unit 110 may include one or more modules in accordance with each communication mode. A communication mode mainly used for the wireless sound device 100 as the wireless communication module is short-range wireless communication.

Examples the short-range communication mode include Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (Wireless USB).

The controller 170 may sense (or recognize) a terminal, which may perform communication with the wireless sound device 100, near the wireless sound device 100. Moreover, if the sensed terminal is a terminal authenticated to perform communication with the wireless sound device 100 according to the present disclosure, the controller 170 may transmit at least a portion of data processed in the wireless sound device 100 to the terminal through the wireless communication unit 110.

Therefore, a user of the wireless sound device 100 may use data processed by the mobile terminal through the wireless sound device 100. For example, the user may perform a phone call through the wireless sound device 100 if a call is received in the mobile terminal, or may check a message received through the wireless sound device 100 if the message is received in the mobile terminal.

The user input unit 120 is intended to receive information from a user, and if information is input through the user input unit 120, the controller 170 may control the operation of the wireless sound device 100 to correspond to input information. Such user input unit 120 may include a touch sensor 130 and a force sensor 140.

The touch sensor 130 senses a touch (or a touch input) applied to the touch sensor 130 using at least one of a variety of touch methods such as a resistive film method, a capacitive method, an infrared method, an ultrasonic method, and a magnetic field method.

As an example, the capacitive touch sensor 130 may convert a change in pressure applied to a specific portion of the touch sensor 130 or a change in capacitance occurring in a specific portion of the touch sensor 130 into an electrical input signal. The touch sensor 130 may detect a position on the touch sensor, an area, a pressure, an electrostatic capacity, and the like of a touch of a touching object that applies the touch. In this regard, the touching object, which is a conductive object that applies the touch to the touch sensor, may be, for example, a finger.

As such, when there is the touch input to the touch sensor 130, a signal(s) corresponding thereto is(are) sent to a touch controller. The touch controller processes the signal(s) and then transmits corresponding data to the controller 170. Accordingly, the controller 170 may identify which region of the touch sensor has been touched, and the like. In this regard, the touch controller may be a component separate from the controller 170, or may be the controller 170 itself.

The force sensor 140 may sense a pressure or a force applied by the user touch. For example, the force sensor 140 may sense a change in capacitance resulted from a force or a pressure applied by an external object and calculate the pressure applied by the user's touch based on the change in capacitance. A strength, a velocity, a position, and/or a direction of the pressure may be provided to the controller 170.

The force sensor 140 may be implemented as a single component (e.g., a one-chip) integrated with the touch sensor, or the force sensor 140 and the touch sensor may be implemented as separate components.

The sound output unit 150 may convert and output audio data received from the wireless communication unit 110 or stored in a memory and sound received from the microphone 160 in a call signal reception mode, a call mode or recording mode, a voice recognition mode, a broadcast reception mode, etc. The sound output unit 150 may output a sound signal related to a call signal reception sound, a message reception sound, etc.

The sound output unit 150 is a converter that coverts an electric signal to sound, and includes main components such as a diaphragm, a voice coil and a magnet.

The diaphragm is a thin vinyl film, and generates sound by changing a flow of the air through its vibration. In order to process all frequency bandwidths from a low bandwidth to a high bandwidth by using one diaphragm, the diaphragm may be coated with a specific material by a method such as steam compression.

The magnet is made of ferrite, aliquot (alloy of Fe, Ni, Al and Co), samarium-cobalt, and neodymium (Nd), and is generally made of a donut shape. The magnet forms a magnetic field, and the voice coil is arranged within the magnetic field formed by the magnet.

The voice coil is a coil attached to the diaphragm, and a current flows to the voice coil in accordance with a sound signal. If the current flowing to the voice coil within the magnetic field formed by the magnet is changed, a force is applied to the voice coil by electromagnetic induction, whereby the diaphragm moves. That is, the current flowing to the voice coil is changed in accordance with the sound signal, and therefore the diaphragm moves, whereby the sound signal is implemented as sound and then the sound is provided to the user.

The microphone 160 processes an external sound signal to electric audio data. The processed audio data may be used in various ways in accordance with a function performed in the wireless sound device 100 or an application program executed in the wireless sound device 10. Meanwhile, various noise cancelling algorithms for cancelling noise generated in the middle of receiving an external sound signal may be implemented in the microphone 160.

Two or more microphones 120 may be provided to implement noise cancelling, and a user's voice or peripheral noise may be determined based on sound varied depending on the position of the microphone 160.

Also, the microphone 160 may amplify external sound which is recognized and then provide the amplified sound through the sound output unit 150, whereby the microphone 160 may serve as an aid that complements hearing of a user whose hearing is bad.

The controller 170 controls the wireless communication unit 110 and the sound output unit 150 based on the control signal received from the microphone 160 and the user input unit 120. The controller 170 may amplify sound received from the microphone 160 and output the amplified sound to the sound output unit 150, or may control the sound output unit 150 in accordance with sound data received through the wireless communication unit 110 to provide the user with music or call sound. Also, the controller 170 may control the operation of the wireless sound device 100 based on the signal input from the user input unit 120 or transmit the control signal input from the user input unit 120 to an external terminal through the wireless communication unit 110.

The battery 180 may supply a power source to each electronic component under the control of the controller 170, and may charge an external power source through a charging terminal. The charging terminal may serve as an interface that transmits and receives data.

A secondary battery that may be packaged in a small space and may be charged and discharged may be used as the battery 180. A main example of the battery 180 may include a lithium ion battery. The lithium ion battery includes a pair of electrodes comprised of a cathode and an anode, and an electrolyte arranged between the electrodes. Oxidation-reduction reaction occurs between the electrolyte and the electrodes and electrons move to supply a power source.

Figure 2:
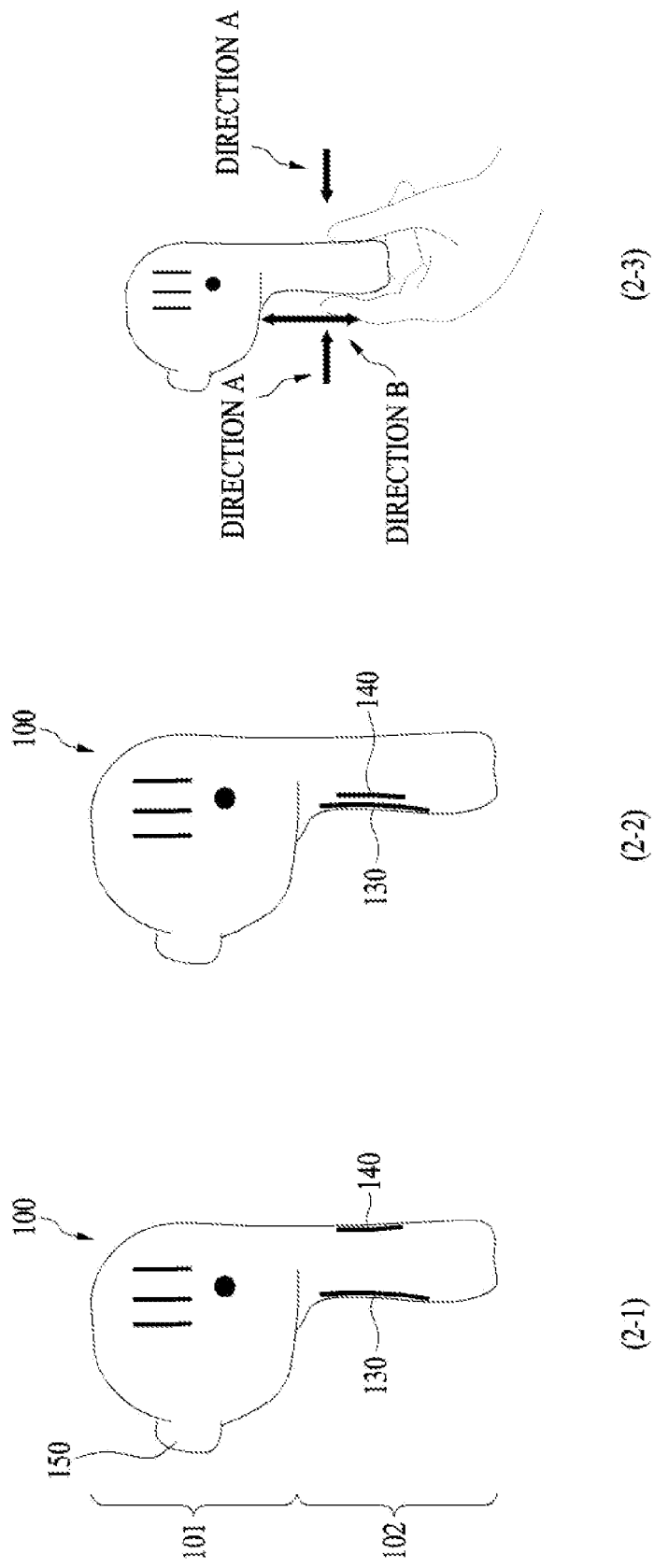
FIG. 2 shows an appearance of a wireless sound device according to an embodiment of the present disclosure.

Hereinafter, an appearance of the wireless sound device 100 according to an embodiment of the present disclosure will be described with reference to FIG. 2. FIG. 2 shows an appearance of a wireless sound device according to an embodiment of the present disclosure.

As shown in (2-1) in FIG. 2, the wireless sound device 100 may largely include a head 101 and a body 102.

Because the head 101 may have the sound output unit 150, at least a portion of the head 101 may have a suitable shape to be inserted into a user's ear.

The touch sensor 130 and the force sensor 140 may be disposed on the body 102. The touch sensor 130 and the force sensor 140 may be respectively disposed on opposite faces of the body 102. In (2-1) in FIG. 2, it is illustrated that the touch sensor 130 is disposed on a face close to the sound output unit 150 and the force sensor 140 is disposed on a face far from the sound output unit 150. However, the touch sensor 130 and the force sensor 140 may be disposed on different faces of the body 100 as long as the touch sensor 130 and the force sensor 140 may be disposed on substantially opposite faces.

In one example, as shown in (2-2) in FIG. 2, the touch sensor 130 and the force sensor 140 may be disposed on the same face of the body 102 to overlap each other. To this end, the force sensor 140 may be disposed on a rear face of the touch sensor 130. In (2-2) in FIG. 2, it is illustrated that the touch sensor 130 and the force sensor 140 are disposed on the face close to the sound output unit 150. However, the touch sensor 130 and the force sensor 140 may be disposed on a different face of the body 100 as long as the touch sensor 130 and the force sensor 140 may be disposed on substantially the same face.

When the touch sensor 130 and the force sensor 140 are disposed on the wireless sound device 100 as shown in (2-1) and (2-2) in FIG. 2, in the wireless sound device 100, a user's touch may be applied to the touch sensor 130 and the force sensor 140 as shown in (2-3) in FIG. 2. The user may hold the body 102 with two fingers and apply a touch gesture in a direction B while applying a pressure or a force to the force sensor 140 in a direction A.

In FIG. 2, it is shown that the wireless sound device 100 is composed of the head 101 and the body 102, and the body 102 is formed in a cylindrical shape and extended from the head 101. However, the present disclosure is not limited thereto. In one example, the body 102 may be formed in a shape other than the cylindrical shape.

Figure 3:
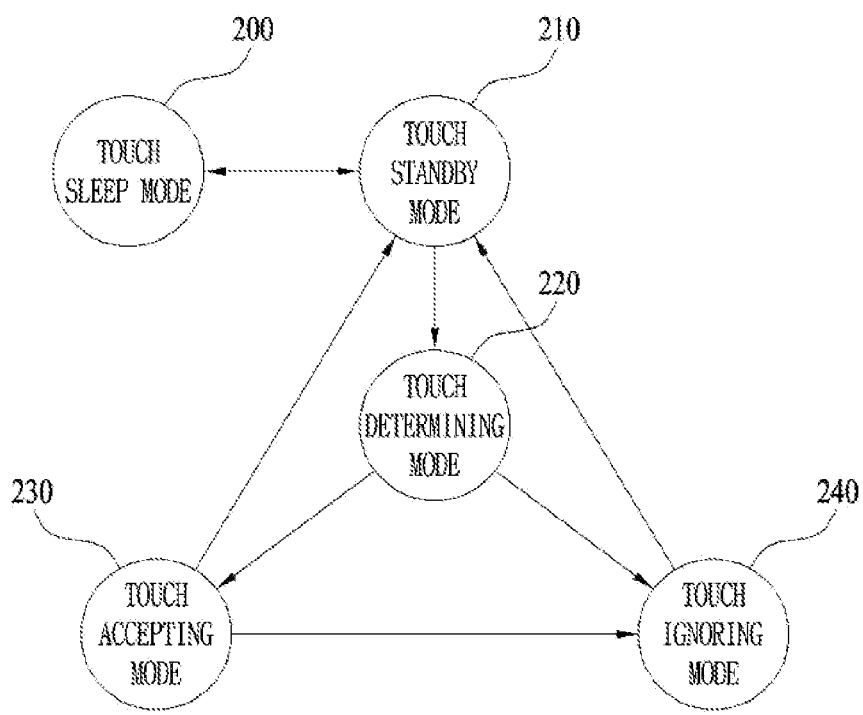
FIG. 3 is a flowchart illustrating touch mode switching of a wireless sound device according to an embodiment of the present disclosure.

Hereinafter, touch mode switching of the wireless sound device 100 will be described with reference to FIG. 3. FIG. 3 is a flowchart illustrating touch mode switching of a wireless sound device according to an embodiment of the present disclosure.

The wireless sound device 100 may be in a touch standby mode 210. The touch standby mode 210, which is a basic state in which the touching object such as the user's finger does not touch the touch sensor, may refer to a state in which, when the touching object touches the touch sensor, the touch may be immediately sensed. Hereinafter, a description will be made assuming that the touching object is the user's finger.

When the wireless sound device 100 is in a touch standby mode 210, the user's finger may touch the touch sensor 130. Then, a touch mode of the wireless sound device 100 may be switched from the touch standby mode 210 to a touch determining mode 220.

In the touch determining mode 220, the wireless sound device 100 may determine whether the touch is an intentional touch of the user with respect to the touch sensor 130 or an unintentional touch. The determination will be described again later.

As a result of the determination, when it is determined that the touch is the intentional touch of the user, the touch mode of the wireless sound device 100 may be switched to a touch accepting mode 230. Because the determination in the touch determining mode may be made for a very short time, from a user's point of view, it may be seen that the touch mode of the wireless sound device 100 is directly switched from the touch standby mode 210 to the touch accepting mode 230.

In the touch accepting mode 230, the wireless sound device 100 may perform an operation corresponding to the touch with respect to the touch sensor 130.

On the other hand, when it is determined as the result of the determination that the touch is the unintentional touch of the user, the touch mode of the wireless sound device 100 may be switched to a touch ignoring mode 240. Because the determination in the touch determining mode may be made for the very short time, from the user's point of view, it may be seen that the touch mode of the wireless sound device 100 is directly switched from the touch standby mode 210 to the touch ignoring mode 240.

In the touch ignoring mode 240, the wireless sound device 100 may ignore the touch with respect to the touch sensor 130 and not perform an operation corresponding thereto until the touch is released.

When the wireless sound device 100 is maintained in the touch standby mode for a predetermined time or longer, the touch mode thereof may be switched to a touch sleep mode 200. The touch sleep mode 200 is a mode for saving power supplied to the touch sensor 130 for sensing the touch. During the touch sleep mode 200, the power may be saved by making a period of a current for sensing the touch longer.

On the other hand, as shown in (2-3) in FIG. 2, in the case in which the user holds the body 102 of the wireless sound device 100 with the two fingers, when the user inputs the touch to the touch sensor 130, the force sensor 140 inevitably senses the pressure or the force induced by the touch. That is, while the touch is sensed by the touch sensor 130, the pressure corresponding to the touch is sensed by the force sensor 140. The opposite is also true. When the user performs the touch to input the force to the force sensor 140, the touch sensor 130 inevitably senses the touch induced by the force. That is, as the force sensor 140 senses the pressure based on the force, the touch sensor 130 senses the touch corresponding to the force.

In this case, from a point of view of the wireless sound device 100, there may be a need for a criterion for making it clear whether the user's touch is the touch input with respect to the touch sensor 130 or the force input with respect to the force sensor 140. This will be further described with reference to FIG. 4. FIG. 4 shows graphs illustrating pressures corresponding to a touch input and a force input according to an embodiment of the present disclosure. FIG. 4 is an example for the user to distinguish a single touch input and a single force input from each other. It will be readily apparent to those skilled in the art that this may be applied to distinguish a double (or long) touch input and a double (or long) force input from each other.

As shown in (4-1) in FIG. 4, a pressure having a strength equal to or higher than a predetermined force threshold may be sensed by the force sensor 140 due to the touch. FIG. 4 illustrates that the force threshold is about 200 gf. This may be one reason for the controller 170 of the wireless sound device 100 to determine that the touch is for the user to input the force to the force sensor 140.

Alternatively, as shown in (4-2) in FIG. 4, a pressure having a strength lower than the force threshold and equal to or higher than a predetermined touch threshold may be sensed by the force sensor 140 due to the touch. FIG. 4 illustrates that the touch threshold is about 30 gf. This may be one reason for the controller 170 to determine that the touch is for the user to input the touch to the touch sensor 130.

Alternatively, as shown in (4-3) in FIG. 4, a pressure having a strength lower than the touch threshold may be sensed by the force sensor 140 due to the touch. In this case, the controller 170 may be one reason for the controller 170 to determine that the touch is not a touch intentionally input by the user to any of the touch sensor 130 and the force sensor 140.

Figure 5:
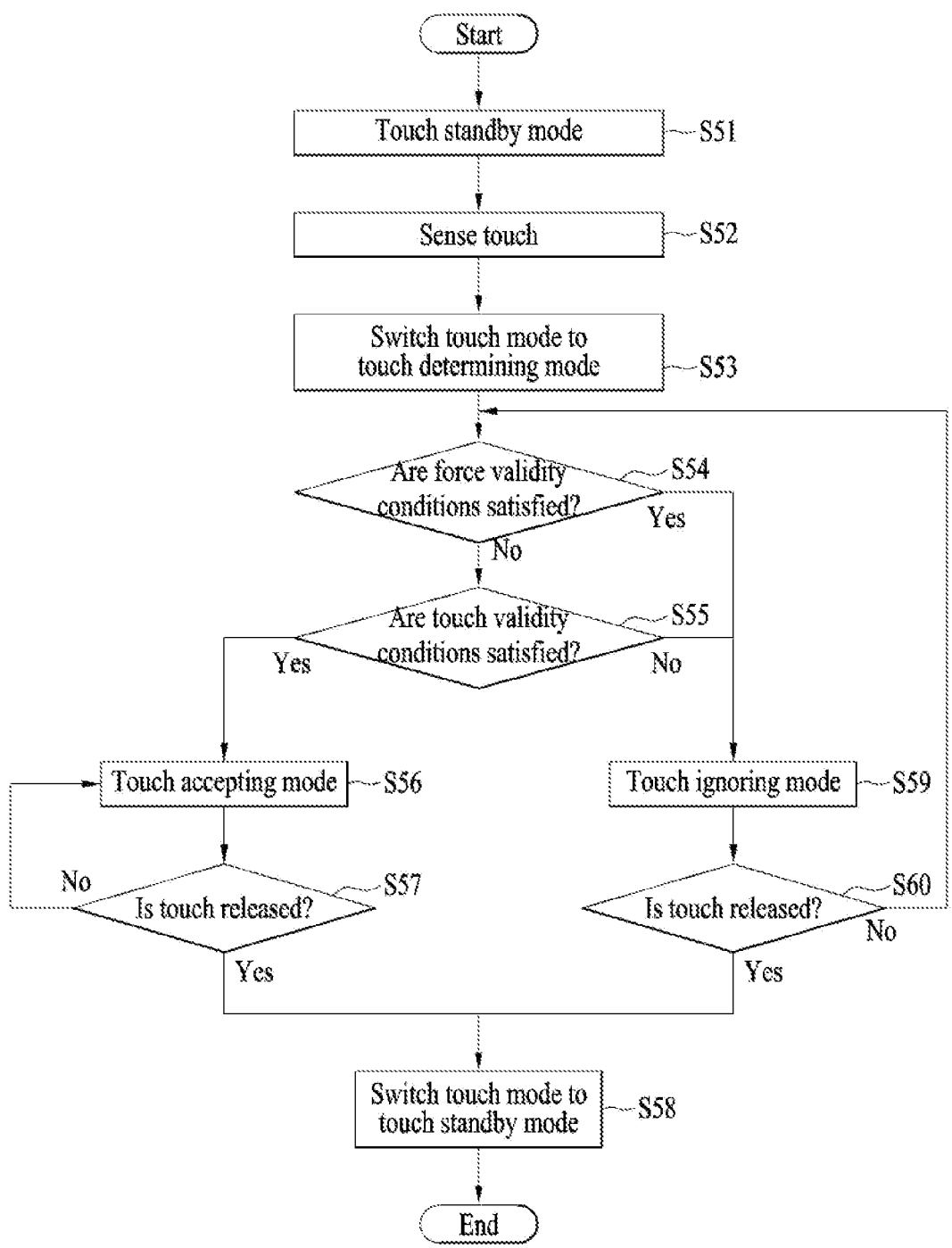
FIGS. 5 to 8 are flowcharts for distinguishing a touch applied for a touch sensor and a touch applied for a force sensor from each other according to an embodiment of the present disclosure.

Hereinafter, with further reference to FIGS. 5 and 8, a more detailed description will be given on determining of whether the touch applied to the wireless sound device 100 by the user is for the touch sensor or for the force sensor. FIGS. 5 to 8 are flowcharts for distinguishing a touch applied for a touch sensor and a touch applied for a force sensor from each other according to an embodiment of the present disclosure.

First, with reference to FIG. 5, a description will be given on determining of whether the touch applied to the wireless sound device 100 by the user is intentionally and validly input to the touch sensor.

The wireless sound device 100 may be in the touch standby mode [S51].

When the user's finger touches the touch sensor 130 when the wireless sound device 100 is in the touch standby mode, the wireless sound device 100 may sense the touch [S52].

Then, the controller 170 may control the wireless sound device 100 to switch the touch mode from the touch standby mode to the touch determining mode [S53].

Then, the controller 170 may determine whether the touch is for inputting the force to the force sensor 140 [S54]. That is, the controller 170 may determine whether the touch satisfies conditions regarding whether the touch is valid to meet the user's intention as the input to the force sensor 140, that is, force validity conditions. One of the force validity conditions may be whether the pressure having the strength equal to or higher than the predetermined force threshold is sensed by the force sensor 140 due to the touch, as described with reference to FIG. 4.

When it is determined that the force validity conditions are satisfied, the controller 170 may determine whether the touch is for inputting the touch to the touch sensor 130 [S55]. That is, the controller 170 may determine whether the touch satisfies conditions regarding whether the touch is valid to meet the user's intention as the input to the touch sensor 130, that is, touch validity conditions. One of the touch validity conditions may be whether the pressure having the strength equal to or higher than the predetermined touch threshold is sensed by the force sensor 140 due to the touch, as described with reference to FIG. 4.

When it is determined that the touch validity conditions are satisfied, the controller 170 may control the wireless sound device 100 to switch the touch mode from the touch determining mode to the touch accepting mode [S56]. In the touch accepting mode, the wireless sound device 100 may perform an operation corresponding to the touch with respect to the touch sensor 130. For example, the operation corresponding to the touch may be an audio volume adjusting operation.

Then, the controller 170 may determine whether the touch is released [S57].

When the touch is not released, the controller 170 may control the wireless sound device 100 to remain in the touch accepting mode [S56].

When the touch is released, the controller 170 may control the wireless sound device 100 to return to the touch standby mode from the touch accepting mode [S58].

On the other hand, when it is determined that the force validity conditions are not satisfied or the touch validity conditions are not satisfied, the controller 170 may control the wireless sound device 100 to switch the touch mode from the touch determining mode to the touch ignoring mode [S59]. In the touch ignoring mode, the wireless sound device 100 may ignore the touch to the touch sensor 130 and may not perform the operation corresponding thereto.

Then, the controller 170 may determine whether the touch is released [S60].

When the touch is not released, the controller 170 may control the wireless sound device 100 to return to S54.

When the touch is released, the controller 170 may control the wireless sound device 100 to return to the touch standby mode from the touch accepting mode [S58].

In FIG. 5, it has been described that the determination (S55) on whether the touch validity conditions are satisfied is performed after the determination (S54) on whether the force validity conditions are satisfied. However, the present disclosure is not limited thereto. Conversely, after the determination (S55) on whether the touch validity conditions are satisfied is performed, the determination (S54) on whether the force validity conditions are satisfied may be performed. This will be further described with reference to FIG. 6.

Figure 6:
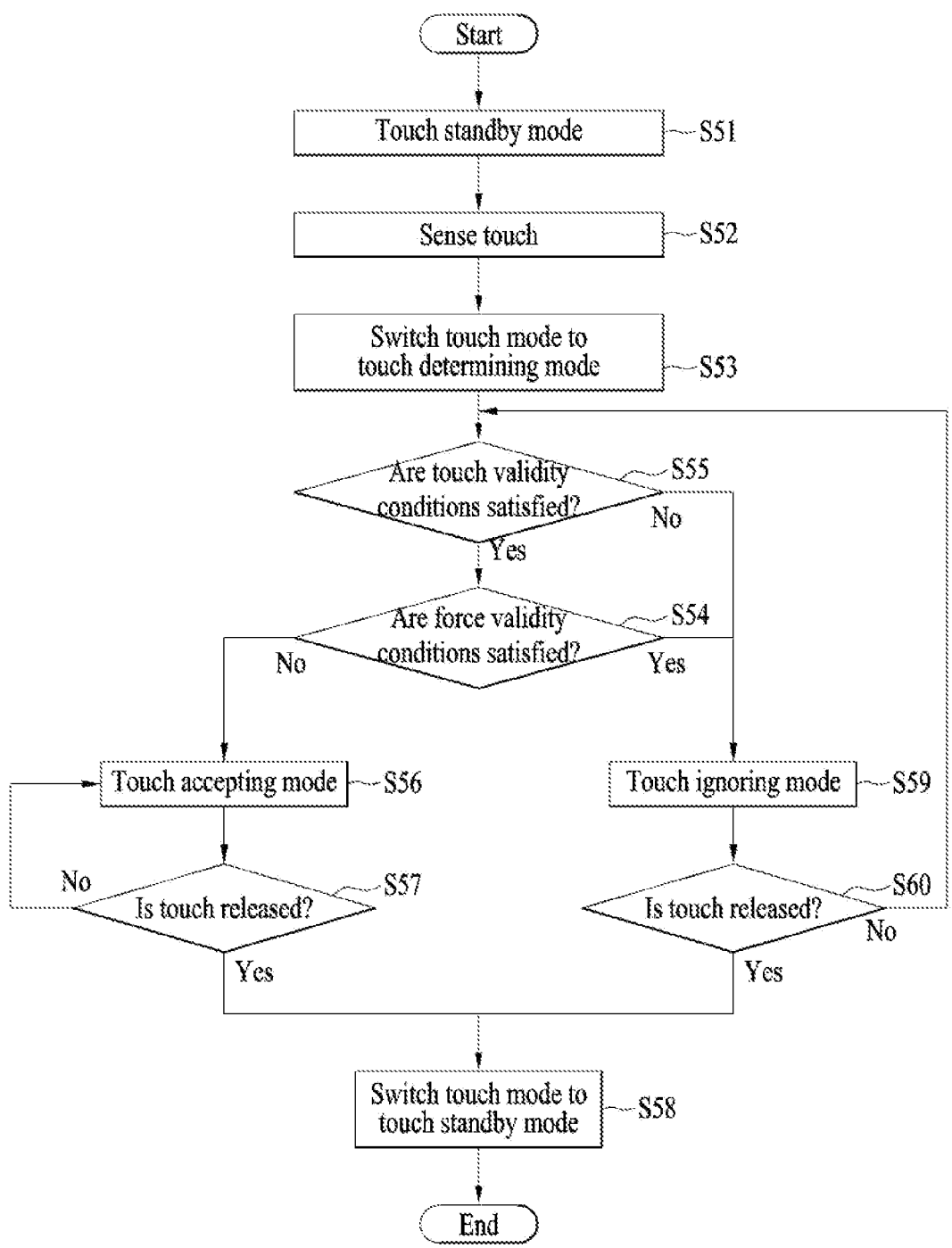

S51 to S53 in FIG. 6 are the same as those described with reference to FIG. 5, so that a description thereof will be omitted for the sake of brevity of the present specification.

When the touch mode of the wireless sound device 100 is switched from the touch standby mode to the touch determining mode, the controller 170 may determine whether the touch satisfies the touch validity conditions [S55].

When it is determined that the touch validity conditions are satisfied, the controller 170 may determine whether the touch satisfies the force validity conditions [S54].

When it is determined that the force validity conditions are not satisfied, the controller 170 may control the wireless sound device 100 to switch the touch mode from the touch determining mode to the touch accepting mode [S56].

Hereinafter, because S57 and S58 are the same as those described with reference to FIG. 5, a description thereof will be omitted for the sake of brevity of the present specification.

On the other hand, when it is determined that the touch validity conditions are not satisfied or the force validity conditions are not satisfied, the controller 170 may control the wireless sound device 100 to switch the touch mode from the touch determining mode to the touch ignoring mode [S59].

Then, the controller 170 may determine whether the touch is released [S60].

When the touch is not released, the controller 170 may control the wireless sound device 100 to return to S55.

When the touch is released, the controller 170 may control the wireless sound device 100 to return to the touch standby mode from the touch accepting mode [S58].

In one example, with reference to FIG. 7, a description will be given on determining of whether the touch applied to the wireless sound device 100 by the user is intentionally and validly input to the force sensor 140.

When the wireless sound device 100 senses the touch (S71), the controller 170 may determine whether the touch satisfies the conditions regarding whether the touch is valid to meet the user's intention as the input to the force sensor 140, that is, the force validity conditions [S72]. One of the force validity conditions may be whether the pressure having the strength equal to or higher than the predetermined force threshold is sensed by the force sensor 140 due to the touch, as described with reference to FIG. 4.

When it is determined that the force validity conditions are satisfied, the controller 170 may determine whether the wireless sound device 100 is in the touch accepting mode when the touch is sensed [S73].

When the wireless sound device 100 is not in the touch accepting mode (that is, is in one of the touch sleep mode, the touch standby mode, the touch determining mode, and the touch ignoring mode), the controller 170 may determine that the touch is for intentionally inputting the force to the force sensor 140 [S74]. Accordingly, the controller 170 may control the wireless sound device 100 to perform the operation corresponding to the input force. For example, the operation corresponding to the input force may be one of audio playback, stop, next audio file playback, previous audio file playback, and the like.

On the other hand, when it is determined that the force validity conditions are not satisfied or when the wireless sound device 100 is in the touch accepting mode, the controller 170 may determine that the touch is not for intentionally inputting the force to the force sensor 140 [S75]. The controller 100 may control the wireless sound device 100 to ignore the touch to the touch sensor 130 and not to perform the operation corresponding thereto.

For reference, the sensing of the touch of S71 in the touch determining mode, the touch accepting mode, and the touch ignoring mode may mean a situation in which the force is applied to increase the pressure while maintaining the touch after the user touches the wireless sound device 100 with the finger.

Figure 7:
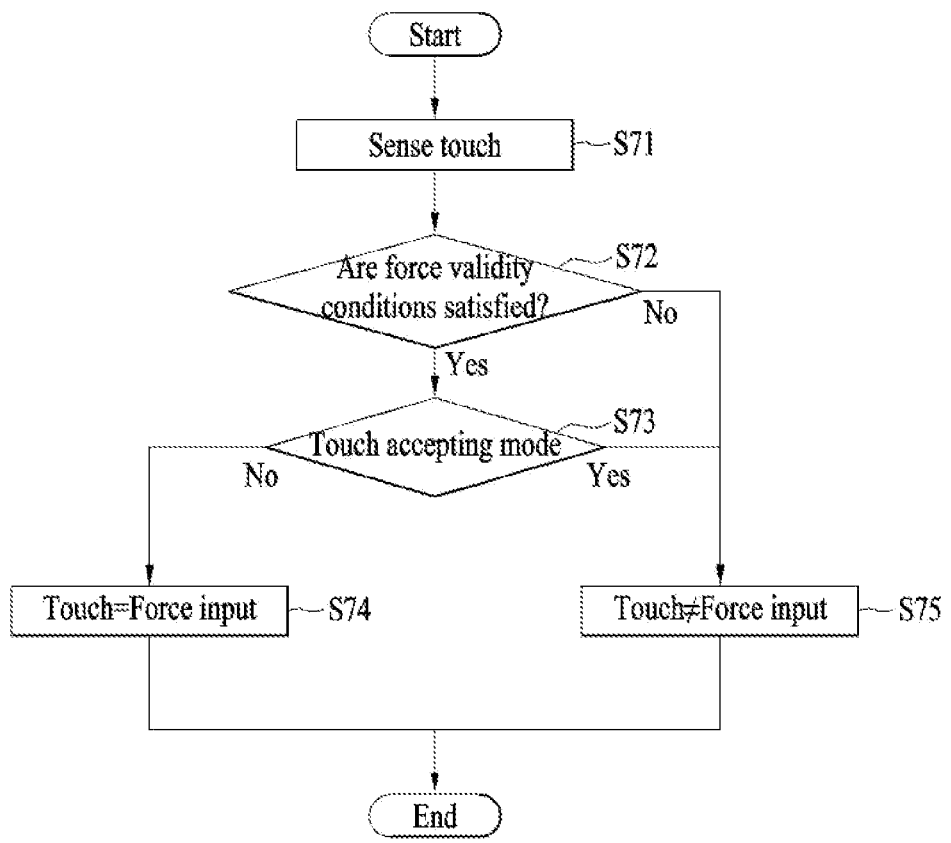
Figure 8:
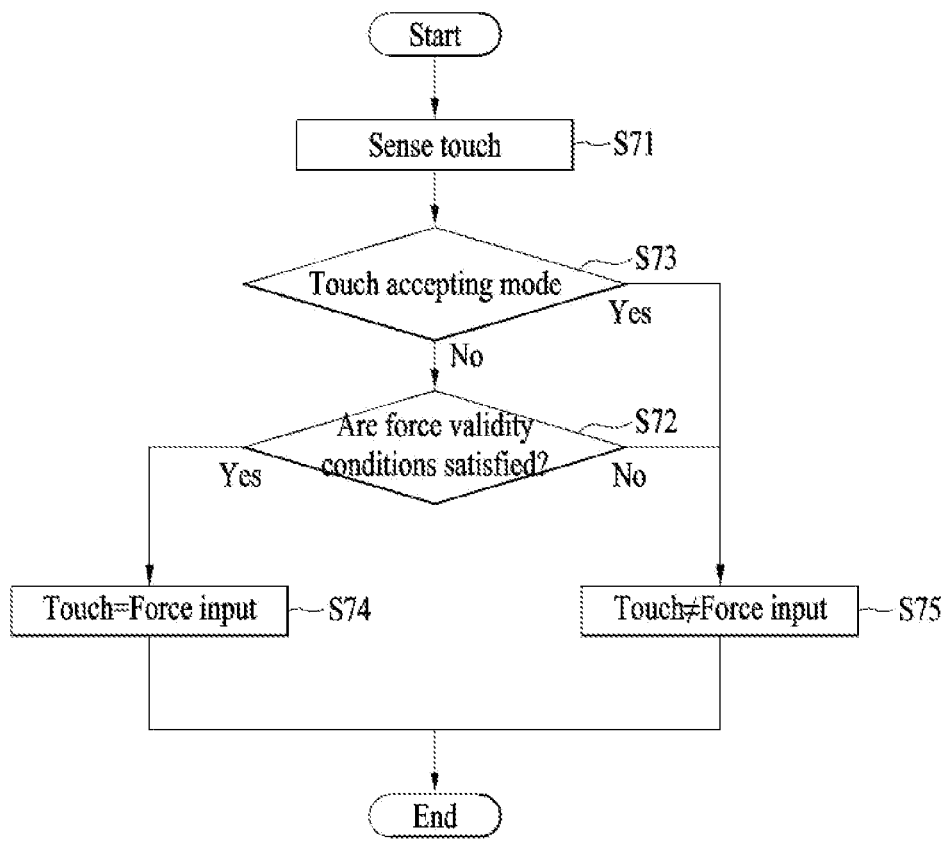

In FIG. 7, it has been described that the determination (S73) on whether the touch mode is the touch accepting mode determination is performed after the determination (S72) on whether the force validity conditions are satisfied. However, the present disclosure is not limited thereto. Conversely, after the determination (S73) on whether the touch mode is the touch accepting mode determination, the determination (S72) on whether the force validity conditions are satisfied may be performed. This will be further described with reference to FIG. 8.

When the wireless sound device 100 senses the touch (S71), the controller 170 may determine whether the wireless sound device 100 is in the touch accepting mode when the touch is sensed [S73].

When the wireless sound device 100 is not in the touch accepting mode (that is, is in one of the touch sleep mode, the touch standby mode, the touch determining mode, and the touch ignoring mode), the controller 170 may determine whether the touch satisfies the conditions regarding whether the touch is valid to meet the user's intention as the input to the force sensor 140, that is, the force validity conditions [S72].

When it is determined that the force validity conditions are satisfied, the controller 170 may determine that the touch is for intentionally inputting the force to the force sensor 140 [S74]. Accordingly, the controller 170 may control the wireless sound device 100 to perform the operation corresponding to the input force.

On the other hand, when the wireless sound device 100 is in the touch accepting mode or when it is determined that the force validity conditions are not satisfied, the controller 170 may determine that the touch is not for intentionally inputting the force to the force sensor 140 [S75]. The controller 100 may control the wireless sound device 100 to ignore the touch to the touch sensor 130 and not to perform the operation corresponding thereto.

Hereinafter, with reference to FIG. 9, switching from the touch sleep mode to the touch standby mode will be described.

Figure 9:
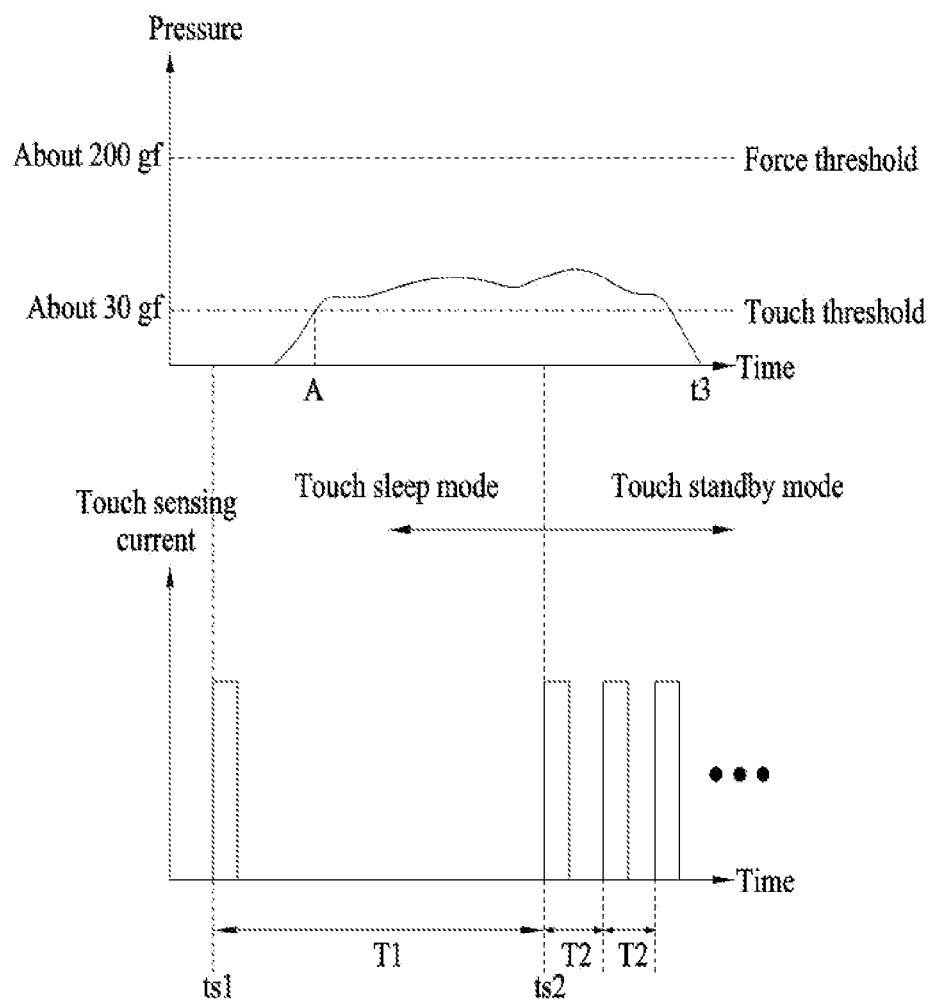
FIG. 9 shows a pressure graph for a wireless sound device to switch a touch mode from a touch sleep mode to a touch standby mode, according to an embodiment of the present disclosure.

FIG. 9 shows a pressure graph for a wireless sound device to switch a touch mode from a touch sleep mode to a touch standby mode, according to an embodiment of the present disclosure.

As described above, during the touch sleep mode, it is possible to save power by making the period of the current for sensing the touch longer than that during the touch standby mode. It will be assumed that a period of the current for sensing the touch of the touch sleep mode is T1 and a period of the current for sensing the touch of the touch sleep mode is T2.

As shown in FIG. 9, it is assumed that, in the touch sleep mode, a first current square wave for sensing the touch is generated at a time point ts1 and a second current square wave for sensing the touch is generated at a time point ts2, which is a time point after a T1 period from the time point ts1. It is assumed that, the touch having the strength less than the force threshold and equal to or higher than the touch threshold is applied in the touch sleep mode at a time point A between the time point ts1 and the time point ts2 and maintained to a time point after the time point ts2.

Then, because the current for sensing the touch is not supplied to the touch sensor 130 at the time point A, the controller 170 is not able to sense that the touch is being performed through the touch sensor 130 directly at the time point A. That is, the controller 170 may sense through the touch sensor 130 that the touch is being performed after waiting until the time point ts2 when the current for sensing the touch is supplied.

When the touch is sensed through the touch sensor 130 at the time point ts2, the controller 170 may control the wireless sound device 100 to switch the touch mode from the touch sleep mode to the touch standby mode after the time point ts2.

That is, even when the touch is applied to the wireless sound device 100 in the touch sleep mode, it may take a certain amount of time (that is, at least a period of time from the time point A to the time point ts2) to switch the touch mode to the touch standby mode, which may not be immediate for the user.

Hereinafter, with reference to FIGS. 10 and 11, more immediate switching from the touch sleep mode to the touch standby mode will be described.

Figure 10:
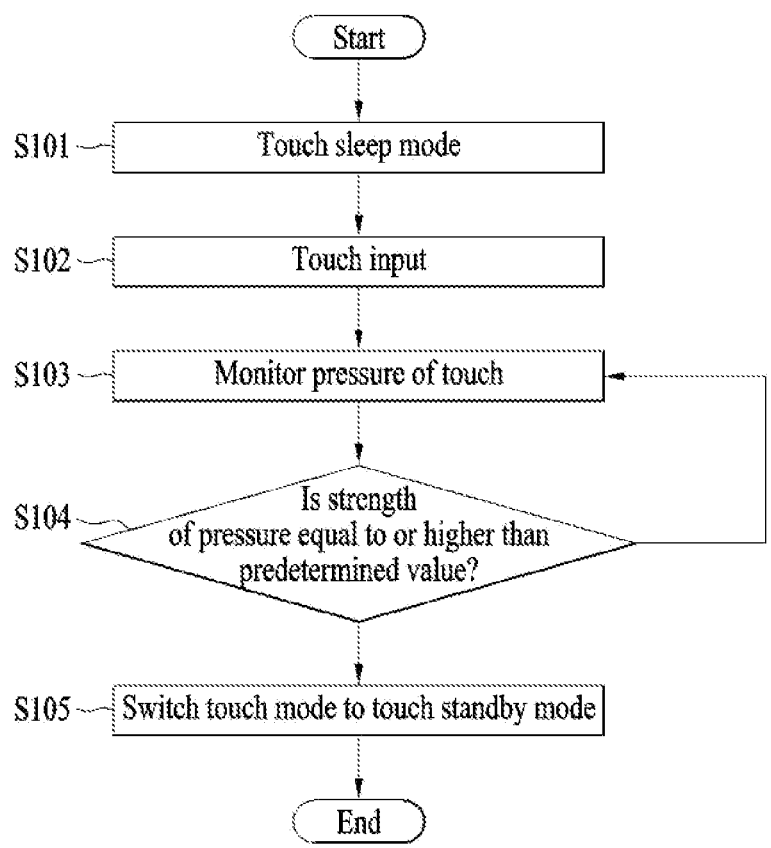
FIG. 10 is a flowchart for a wireless sound device to switch a touch mode from a touch sleep mode to a touch standby mode according to an embodiment of the present disclosure.
Figure 11:
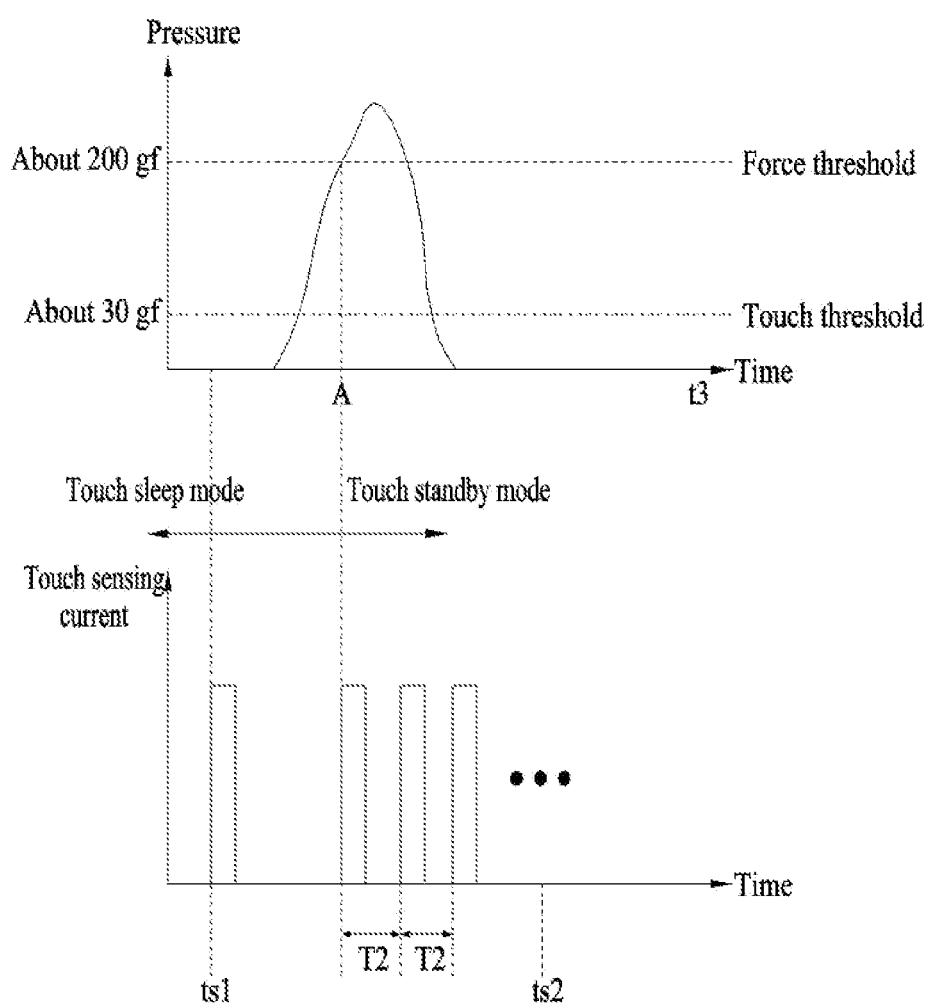
FIG. 11 shows a pressure graph for a wireless sound device to switch a touch mode from a touch sleep mode to a touch standby mode according to an embodiment of the present disclosure.

FIG. 10 is a flowchart for a wireless sound device to switch a touch mode from a touch sleep mode to a touch standby mode according to an embodiment of the present disclosure, and FIG. 11 shows a pressure graph for a wireless sound device to switch a touch mode from a touch sleep mode to a touch standby mode according to an embodiment of the present disclosure.

When the wireless sound device 100 is in the touch sleep mode [S101], the touch may be applied to the wireless sound device 100 [S102].

Then, the controller 170 may monitor the pressure of the touch through the force sensor 140 [S103].

When the pressure has the strength equal to or higher than the predetermined value (e.g., the force threshold), the controller 170 may control the wireless sound device 100 to switch the touch mode from the touch sleep mode to the touch standby mode immediately at a time point (that is, the time point A) when the strength of the pressure of the touch becomes equal to or higher than the predetermined value. That is, it is possible to switch the touch mode from the touch sleep mode to the touch standby mode more quickly without waiting until the time point ts.

Figure 12:
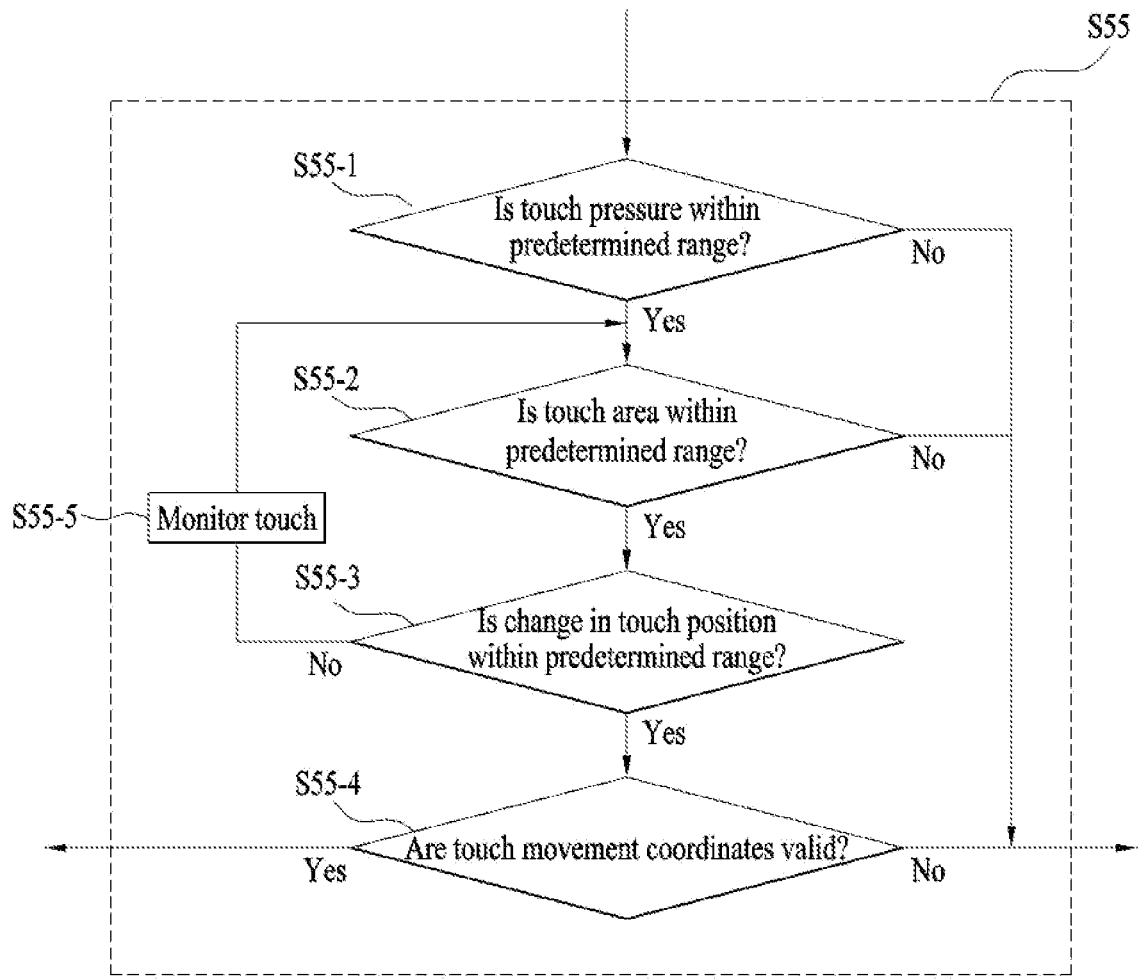
FIG. 12 is a flowchart for determining whether touch validity conditions are satisfied according to an embodiment of the present disclosure.

In FIGS. 5 to 9 above, it has been described that one of the touch validity conditions may be whether the pressure having the strength equal to or higher than the predetermined touch threshold is sensed by the force sensor 140 due to the touch. However, the touch validity conditions are not limited thereto. This will be further described with reference to FIG. 12. FIG. 12 is a flowchart for determining whether touch validity conditions are satisfied according to an embodiment of the present disclosure.

As shown in FIG. 12, S55 related to the determination on whether the touch validity conditions are satisfied may be performed through several sub-divided operations.

First, the controller 170 may determine whether the pressure having the strength equal to or higher than the predetermined touch threshold and lower than the predetermined force threshold is sensed by the force sensor 140 due to the touch [S55-1].

When a result of the determination in S55-1 is positive, the controller 170 may determine whether the area of the touch applied onto the touch sensor 130 is within a predetermined area range [S55-2]. This is to determine that the touch is invalid because it is highly likely that the user has unintentionally touched the wireless sound device 100 when the area of the touch is too wide or too narrow.

When a result of the determination in S55-2 is positive, the controller 170 may determine whether a change in the position of the touch applied onto the touch sensor 130 is within a predetermined range [S55-3]. This is to determine that the touch is invalid because it is highly likely that the user has unintentionally touched the wireless sound device 100 when the change in the position of the touch is too small or too large.

When a result of the determination in S55-3 is positive, the controller 170 may determine whether movement coordinates of the touch applied onto the touch sensor 130 are valid [S55-4]. This is to determine that the touch is invalid because it is highly likely that the user has unintentionally touched the wireless sound device 100 when, for example, the movement coordinates of the touch are sensed in a second direction perpendicular to a first direction, not in the predefined first direction (that is, a longitudinal direction of the body 102). Alternatively, this is to determine that the touch is invalid because it is highly likely that the user has unintentionally touched the wireless sound device 100 when, for example, a width of the movement coordinates per unit time is too large.

When a result of the determination in S55-4 is positive, the controller 170 may ultimately determine that the touch validity conditions are satisfied. In addition, when the result of the determination in S55-4 is negative, the controller 170 may ultimately determine that the touch validity condition determination are not satisfied. When the result of the determination in S55-1 or in S55-2 is negative, the controller 170 may immediately and ultimately determine that the touch validity conditions are not satisfied.

On the other hand, when the result of the determination in S55-3 is negative, the controller 170 may continue to monitor the touch until the touch is released (S55-5), and may perform control to return to the determination in S55-2 based on the monitoring result.

In FIG. 12, it is illustrated as returning to the determination in S55-2 when the result of the determination in S55-3 is negative, but it may be okay to return to the determination in S55-1.

In FIG. 12, it has been described that all of the determinations in S55-1 to S55-4 are used to determine whether the touch validity conditions are satisfied, but the present disclosure is not limited thereto. Only some of the determinations in S55-1 to S55-4 may be utilized.

Figure 13:
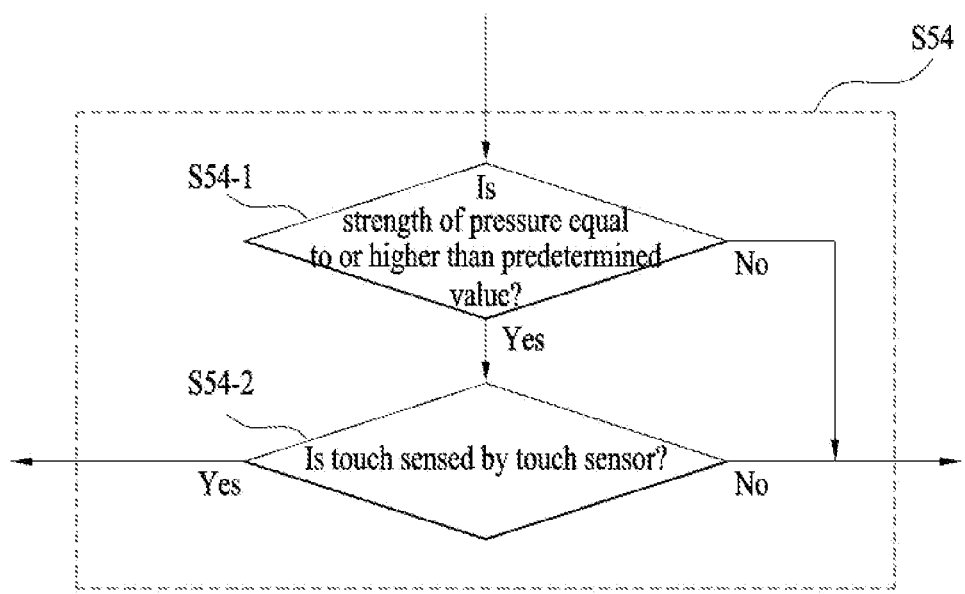
FIG. 13 is a flowchart for determining whether force validity conditions are satisfied according to an embodiment of the present disclosure.

In FIGS. 5 to 9 above, it has been described that one of the force validity conditions may be whether the pressure having the strength equal to or higher than the predetermined force threshold is sensed by the force sensor 140 due to the touch. However, the force validity conditions are not limited thereto. This will be further described with reference to FIG. 13. FIG. 13 is a flowchart for determining whether force validity conditions are satisfied according to an embodiment of the present disclosure.

First, the controller 170 may determine whether the pressure having the strength equal to or higher than the predetermined force threshold is sensed by the force sensor 140 due to the touch [S54-1].

When a result of the determination in S54-1 is positive, the controller 170 may determine whether the touch is sensed by the touch sensor 130 [S54-2]. This is to determine that the touch is invalid because it is highly likely that the user has unintentionally touched the wireless sound device 100 when an insulator (e.g., a collar, a mask, and the like) other than the finger touches the wireless sound device 100 as the touching object.

When a result of the determination in S54-2 is positive, the controller 170 may ultimately determine that the force validity conditions are satisfied. In addition, when the result of the determination in S54-2 is negative, the controller 170 may ultimately determine that the force validity conditions are not satisfied. When the result of the determination in S54-1 is negative, the controller 170 may immediately and ultimately determine that the force validity conditions are not satisfied.

In one example, an order of the determination in S54-1 and the determination in S54-2 may be changed.

In FIG. 13, it has been described that both the determinations in S54-1 and in S54-2 are used to determine whether the force validity conditions are satisfied, but the present disclosure is not limited thereto. One of the determinations in S54-1 and in S54-2 may be utilized.

Figure 14:
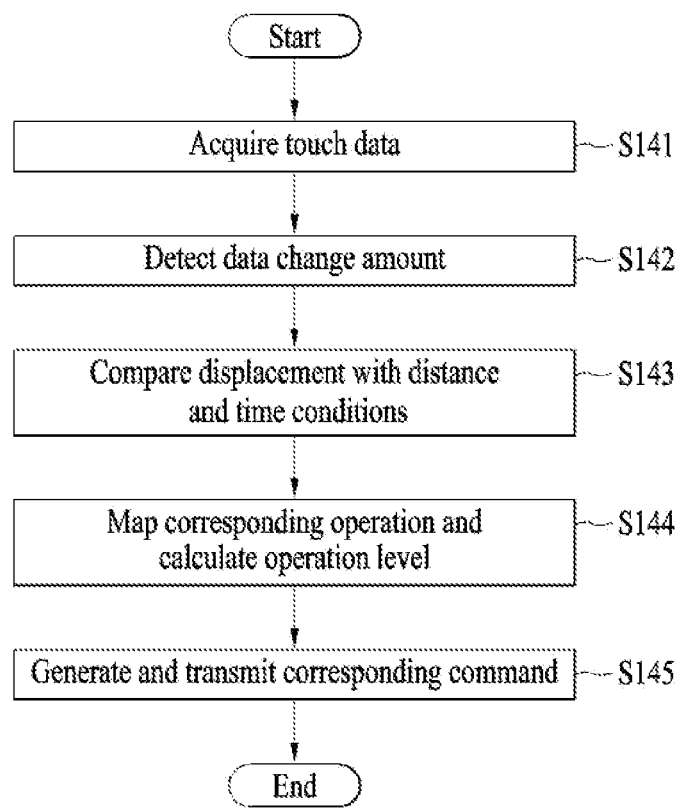
FIG. 14 is a flowchart illustrating calculation of a level of an operation of a wireless sound device executed in response to a touch gesture sensed in a touch accepting mode according to an embodiment of the present disclosure.

Hereinafter, with reference to FIG. 14, a level (or a degree) of an operation of the wireless sound device executed in response to the s touch gesture sensed in the touch accepting mode will be described. FIG. 14 is a flowchart illustrating calculation of a level of an operation of a wireless sound device executed in response to a touch gesture sensed in a touch accepting mode according to an embodiment of the present disclosure.

When the touch gesture is sensed by the touch sensor 130 in the touch accepting mode, the controller 170 may acquire touch data of the touch gesture [S141].

The controller 170 may detect a data change amount of the touch gesture from the touch data [S142]. The data change amount may relate to a displacement of the touch on the touch sensor 130 based on the touch gesture.

The controller 170 may compare the displacement of the touch with preset distance and time conditions [S143]. The preset distance and time conditions may be based on a correlation between the touch displacement of the touch gesture and a touch time required for the displacement. This will be described again later.

The controller 170 may calculate an operation corresponding to the touch gesture and an operation level thereof based on the comparison result [S144].

In addition, the controller 170 may generate the operation and the operation level thereof and transmit the same to a module or an external device related to the operation [S145].

Figure 15:
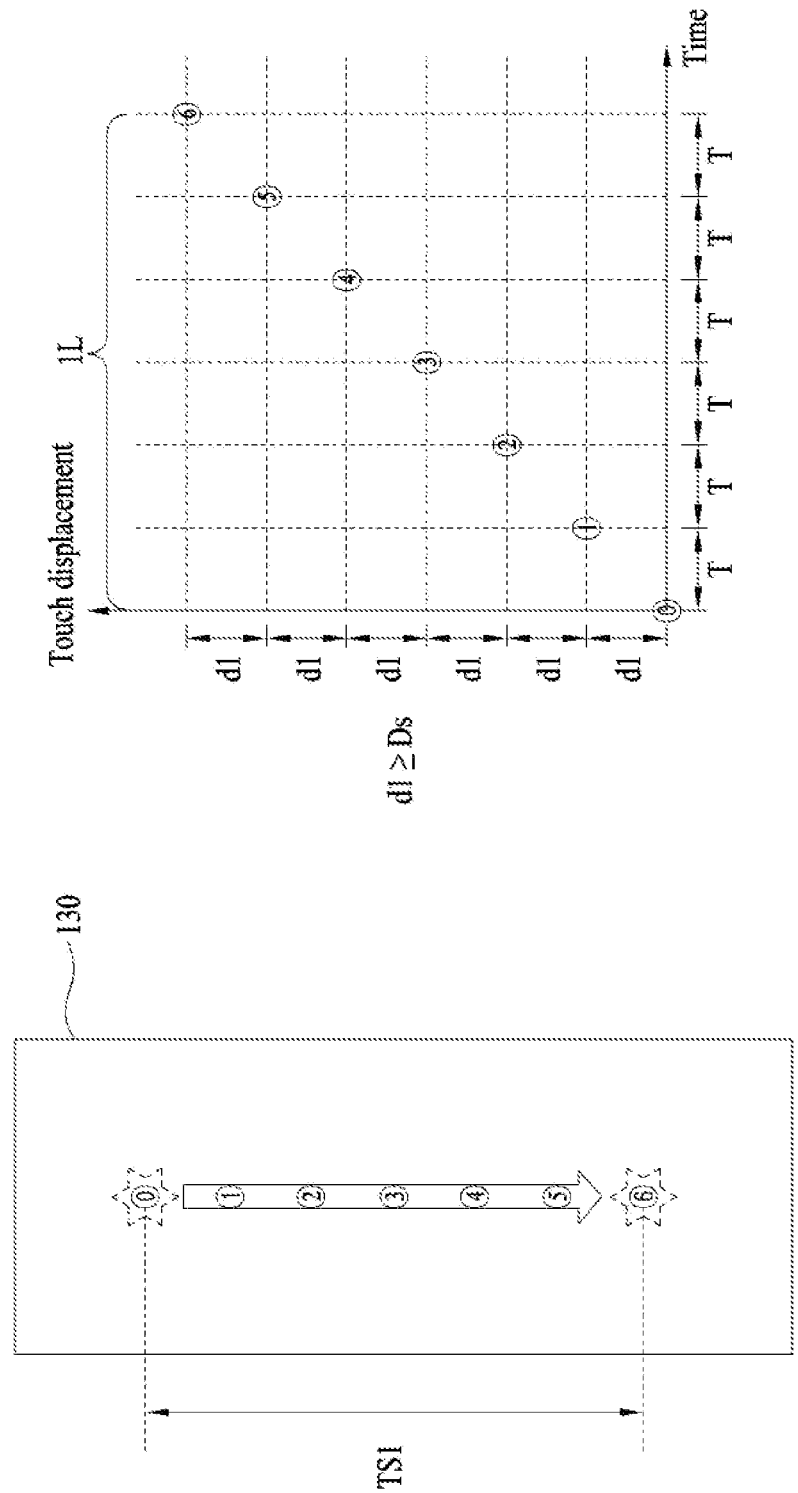
FIGS. 15 to 17 are graphs illustrating a touch gesture that may be performed on a touch sensor and a displacement distance per unit time of the touch gesture, according to an embodiment of the present disclosure.
Figure 16:
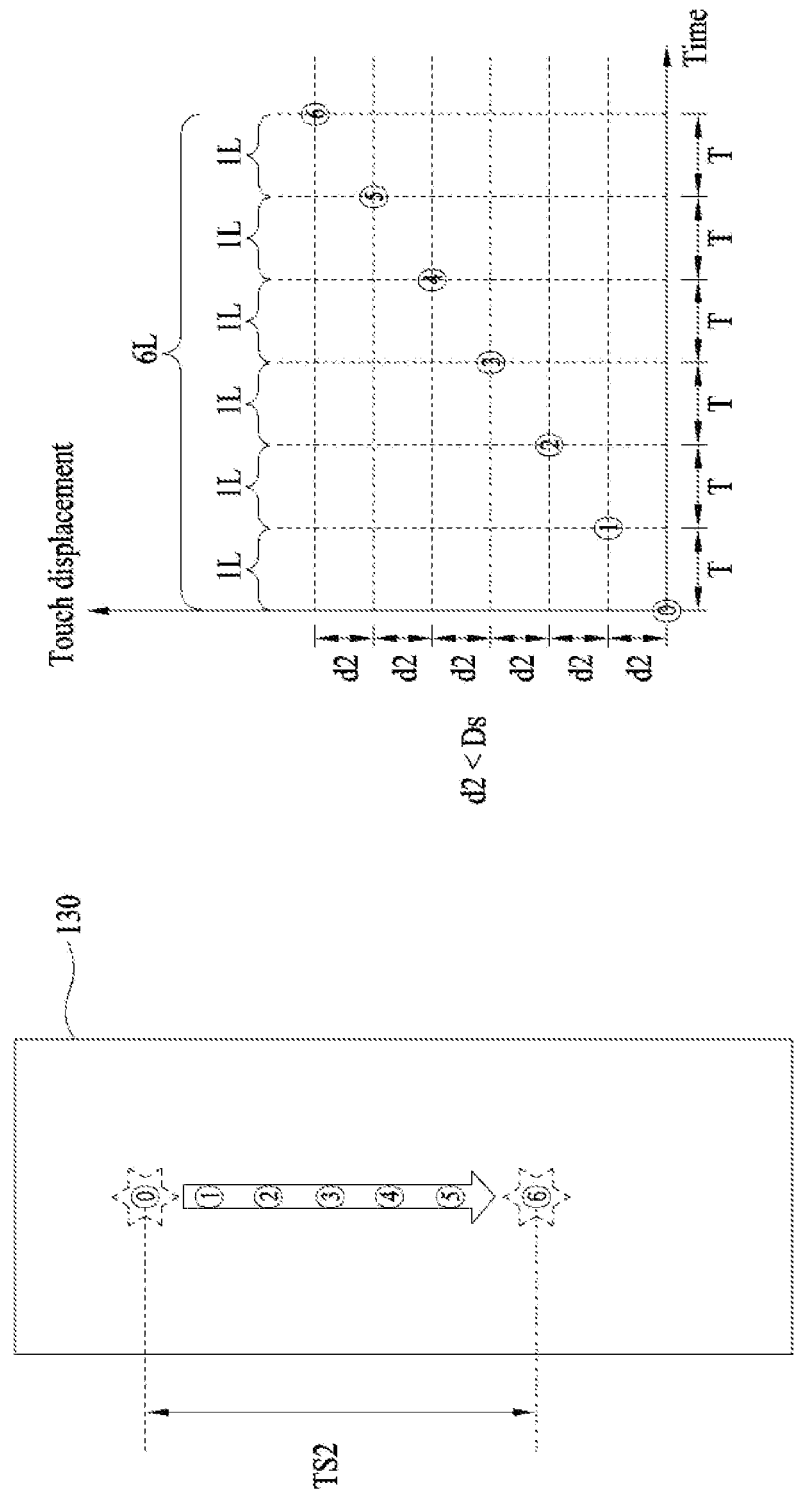
Figure 17:
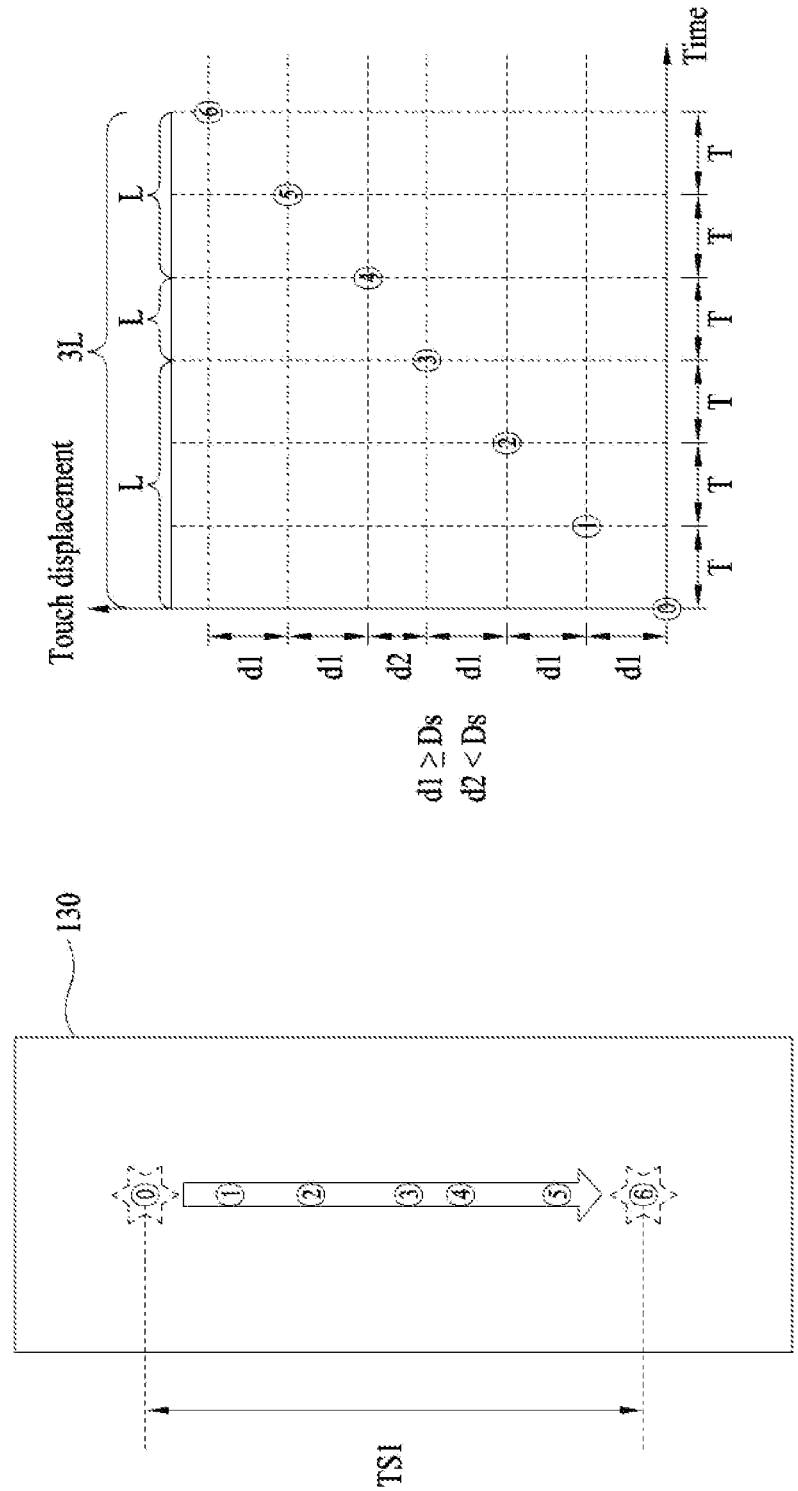

Hereinafter, with reference to FIGS. 15 to 17, a description will be given on a change in the operation level based on a displacement distance per unit time of the touch gesture. FIGS. 15 to 17 are graphs illustrating a touch gesture that may be performed on a touch sensor and a displacement distance per unit time of the touch gesture, according to an embodiment of the present disclosure.

Hereinafter, it will be assumed that the touch gesture corresponds to the operation for adjusting the audio volume of the wireless sound device and the operation level is an audio volume level.

As shown in FIG. 15, a touch gesture that is performed on the touch sensor 130 may be performed. For example, the touch gesture may be a touch scroll. A total distance of the touch scroll may be a first scroll distance TS1, and the touch scroll may be performed to be displaced by a first distance d1 per unit time T. The first distance d1 may be equal to or greater than a preset reference distance ds. In FIG. 15, it is exemplified that the first scroll distance TS1=the first distance d1×6.

In FIG. 15, the plurality of first distances d1 are illustrated as being equal to each other. However, the present disclosure it not necessarily limited thereto. The plurality of first distances d1 may be different from each other as long as the plurality of first distances d1 are equal to or greater than the reference distance.

When all displacement distances per unit time are equal to or greater than the reference distance in a plurality of continuous unit times T, the controller 170 may process all of the displacement distances for the plurality of unit times T as changing a one-unit audio volume level (1L). When the touch scroll is input while the audio volume level is "6", the controller 170 may recognize the input touch scroll as an audio volume adjust command for decreasing the audio volume level from "6" to "5" or increasing the audio volume level to "7". The increase and the decrease of the audio volume level may be determined by a direction of the touch scroll. When the touch scrolling along a first direction, which is a downward direction, as shown in FIG. 15 was to decrease the volume level, the touch scrolling in a second direction, which is an opposite upward direction, may be for increasing the volume level.

As shown in FIG. 16 unlikely from FIG. 15, the total distance of the touch scroll on the touch sensor 130 may be a second scroll distance TS2, and the touch scroll may be performed to be displaced by a second distance d2 per unit time T. The second distance d2 may be smaller than the preset reference distance ds. In FIG. 16, it is exemplified that the second scroll distance TS2=the second distance d2×6.

In FIG. 16, the plurality of second distances d2 are illustrated as being equal to each other. However, the present disclosure it not necessarily limited thereto. The plurality of second distances d2 may be different from each other as long as the plurality of second distances d2 are smaller than the reference distance.

When all displacement distances per unit time in a plurality of continuous unit times T are smaller than the reference distance, the controller 170 may process each displacement distance per unit time as changing the one-unit audio volume level (1L). That is, all of the displacement distances for the plurality of unit times T may be interpreted as changing the six-unit audio volume levels (6L). When the touch scroll is input while the audio volume level is "6", the controller 170 may recognize the input touch scroll as an audio volume adjust command for decreasing the audio volume level from "6" to "0" or increasing the audio volume level to "12". As described above, the increase and the decrease of the audio volume level may be determined by the direction of the touch scroll.

In one example, as shown in FIG. 17, a touch scroll in which the first distance d1 and the second distance d2 per unit time T are mixed may be performed on the touch sensor 130. A total distance of the touch scroll is a third scroll distance TS3. The touch scroll may be performed to be displaced by the first distance d1 per unit time T for 3 unit time 3T, then to be displaced by the second distance d2 per unit time T for 1 unit time 1T, and then, to be displaced by the first distance d1 per unit time T for 2 unit times 2T. That is, in FIG. 17, it is exemplified that the third scroll distance TS3=the first distance d1×3+the second distance d2×1+the first distance d1×2.

As described above, when all of the displacement distances per unit time in the plurality of continuous unit times T are smaller than the reference distance, each displacement distance per unit time may be processed as changing the one-unit audio volume level (1L). In addition, when all of the displacement distances per unit time in the plurality of continuous unit times T are smaller than the reference distance, each displacement distance per unit time may be processed as changing the one-unit audio volume level (1L).

Accordingly, the controller 180 may process each of the displacement distance for the first 3 unit times (3T), the displacement distance for the middle 1 unit time (1T), and the displacement distance for the last 2 units time (2T) as changing the one-unit audio volume level (1L). That is, all of the displacement distances for the plurality of unit times T may be interpreted as changing the three-unit audio volume levels (3L). When the touch scroll is input while the audio volume level is "6", the controller 170 may recognize the input touch scroll as an audio volume adjust command for decreasing the audio volume level from "6" to "3" or increasing the audio volume level to "9". As described above, the increase and the decrease of the audio volume level may be determined by the direction of the touch scroll.

Figure 18:
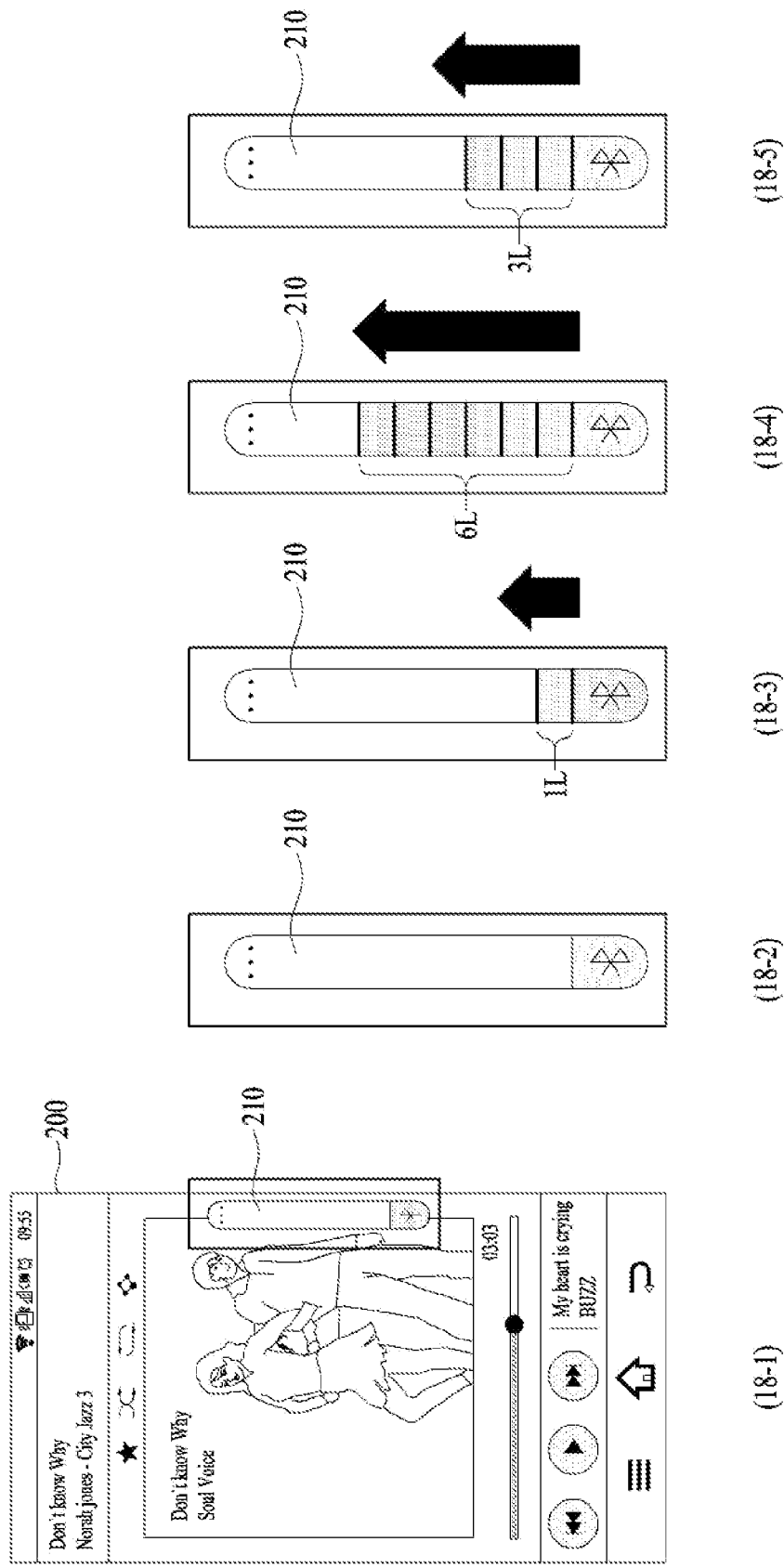
FIG. 18 illustrates an external device that is wirelessly connected to a wireless sound device and plays audio, according to an embodiment of the present disclosure.

The audio volume adjust command recognized as described in FIGS. 15 to 17 may be transmitted to an external device (e.g., a smartphone) that plays audio by being wirelessly connected to the wireless sound device 100 through short-distance communication such as Bluetooth. This will be further described with reference to FIG. 18. FIG. 18 illustrates an external device that is wirelessly connected to a wireless sound device and plays audio, according to an embodiment of the present disclosure.

The wireless sound device 100 may be connected to an external device 200 capable of wirelessly playing the audio. Accordingly, the wireless sound device 100 may wirelessly receive and output an audio signal played by the external device 200. When receiving the audio volume adjust command recognized as described with reference to FIGS. 15 to 17. The wireless sound device 100 may accordingly adjust the audio volume level and wirelessly transmit an audio signal based on the audio volume level to the wireless sound device 100.

(18-1) in FIG. 18 shows an audio playback screen as the external device 200 is playing the audio and shows that an audio volume level 210 is displayed on one side of the audio playback screen.

(18-2) in FIG. 18 is an enlarged view of the audio volume level 210 in (18-1) in FIG. 18.

(18-3) in FIG. 18 shows that, when receiving the audio volume adjust command as described in FIG. 15 while transmitting the audio signal to the wireless sound device 100 at the audio volume level as shown in (18-2) in FIG. 18, the wireless sound device 100 adjusts the audio volume level by one-unit audio volume level (1L) in response to the received audio volume adjust command.

(18-4) in FIG. 18 shows that, when receiving the audio volume adjust command as described in FIG. 16 while transmitting the audio signal to the wireless sound device 100 at the audio volume level as shown in (18-2) in FIG. 18, the wireless sound device 100 adjusts the audio volume level by six-unit audio volume levels (6L) in response to the received audio volume adjust command.

(18-5) in FIG. 18 shows that, when receiving the audio volume adjust command as described in FIG. 17 while transmitting the audio signal to the wireless sound device 100 at the audio volume level as shown in (18-2) in FIG. 18, the wireless sound device 100 adjusts the audio volume level by three-unit audio volume levels (3L) in response to the received audio volume adjust command.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A wireless sound device comprising:
a wireless communication unit including a transceiver for wireless communication with an external device;
a touch sensor for sensing a touch input of a user when the wireless sound device is in a touch standby mode;
a force sensor for sensing a force corresponding to the touch input;
a sound output unit including a speaker for outputting an audio signal received from the external device; and
a controller configured to control a touch mode of the wireless sound device to be set in response to the touch input,
wherein, when a touch validity of the touch input is positive, the controller is configured to control the touch mode to be set to a touch accepting mode or a touch ignoring mode based on a force validity of the touch input,
wherein the controller is configured to determine whether to recognize the force as a force with respect to the force sensor based on whether the wireless sound device is in the touch accepting mode when the force validity of the touch input is positive.

2. The wireless sound device of claim 1, wherein the controller is configured to:
control an operation of the wireless sound device corresponding to the touch input with respect to the touch sensor to be performed in the touch accepting mode; and
control the touch input with respect to the touch sensor to be ignored until the touch input is released from the touch sensor in the touch ignoring mode.

3. A wireless sound device comprising:
a wireless communication unit including a transceiver for wireless communication with an external device;
a touch sensor for sensing a touch input of a user when the wireless sound device is in a touch standby mode;
a force sensor for sensing a force corresponding to the touch input;
a sound output unit including a speaker for outputting an audio signal received from the external device; and
a controller configured to control a touch mode of the wireless sound device to be set in response to the touch input,
wherein, when a touch validity of the touch input is positive, the controller is configured to control the touch mode to be set to a touch accepting mode or a touch ignoring mode based on a force validity of the touch input,
wherein the controller is configured to:
control the touch mode to be set to the touch ignoring mode when the touch validity is positive and the force validity is positive; or
control the touch mode to be set to the touch accepting mode when the touch validity is positive and the force validity is negative.

4. The wireless sound device of claim 1, wherein the controller is configured to control the touch mode to be set to the touch ignoring mode when the touch validity is negative.

5. The wireless sound device of claim 1, wherein the controller is configured to control the touch mode to be set to the touch standby mode when the touch is released.

6. The wireless sound device of claim 1, wherein the touch validity is determined based on a pressure of the touch input.

7. The wireless sound device of claim 6, wherein the touch validity is determined by further considering at least one of a touch area, a change in a touch position, or touch movement coordinates of the touch input.

8. The wireless sound device of claim 1, wherein the controller is configured:
not to recognize the force as an input with respect to the force sensor when the wireless sound device is in the touch accepting mode; and
to recognize the force as the input with respect to the force sensor when the wireless sound device is not in the touch accepting mode.

9. The wireless sound device of claim 1, wherein the force validity is determined based on a pressure of the touch input.

10. The wireless sound device of claim 9, wherein the force validity is determined by further considering whether the touch input is sensed by the touch sensor.

11. The wireless sound device of claim 1, wherein the controller is configured to control the touch mode to be switched from a touch sleep mode to the touch standby mode when a pressure of the touch input during the touch sleep mode has a strength equal to or higher than a preset value.

12. The wireless sound device of claim 1, wherein the controller is configured to adjust an operation level of the wireless sound device in consideration of a scroll distance per unit time of a touch scroll sensed in the touch accepting mode.

13. The wireless sound device of claim 12, wherein the controller is configured to control the scroll distance per unit time of the touch scroll to be inversely proportional to the adjusted operation level.

14. The wireless sound device of claim 12, wherein the controller is configured to control an operation command based on the adjusted operation level to be transmitted to the external device.

15. A method for controlling a wireless sound device, the method performed by the wireless sound device and comprising:
sensing, by a touch sensor of the wireless sound device, a touch input of a user in a touch standby mode and sensing, by a force sensor of the wireless sound device, a force based on the touch input; and
setting a touch mode of the wireless sound device in response to the touch input,
wherein, when a touch validity of the touch input is positive, the touch mode is set to a touch accepting mode or a touch ignoring mode based on a force validity of the touch input,
wherein the method further comprises:
setting the touch mode to the touch ignoring mode when the touch validity is positive and the force validity is positive; or
setting the touch mode to the touch accepting mode when the touch validity is positive and the force validity is negative.

16. The method of claim 15, further comprising:
performing an operation corresponding to the touch input with respect to the touch sensor in the touch accepting mode; and
ignoring the touch input with respect to the touch sensor until the touch input is released from the touch sensor in the touch ignoring mode.

17. The method of claim 15, further comprising:
setting the touch mode to the touch ignoring mode when the touch validity is negative.

18. The method of claim 15, further comprising:
setting the touch mode to the touch standby mode when the touch is released.

* * * * *